Nov. 26, 1940. W. B. WENDEL 2,223,143
MEASURING INSTRUMENT
Filed Nov. 30, 1938
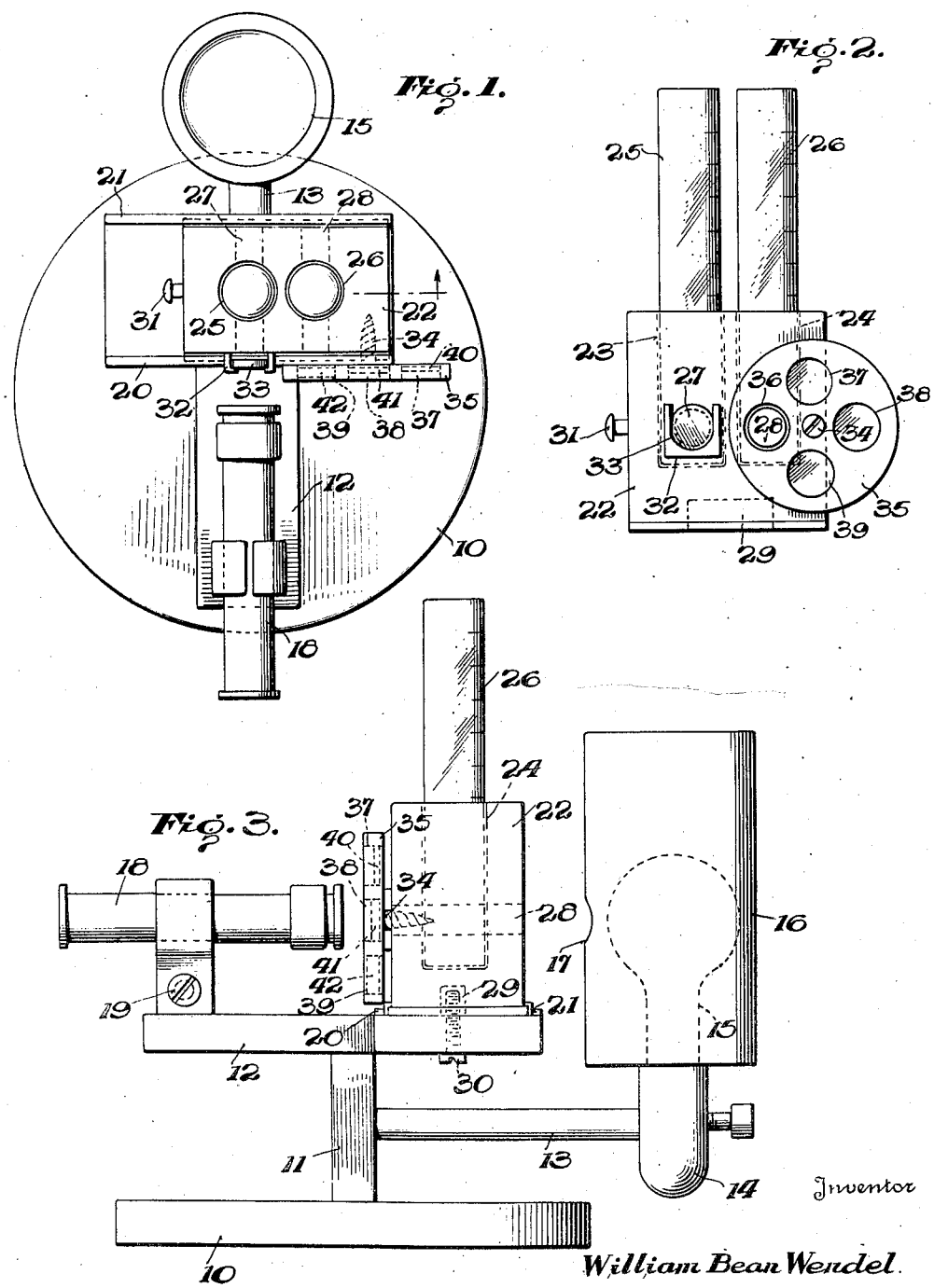
Inventor
William Bean Wendel.
By Cameron, Kerkam & Sutton
Attorneys Patented Nov. 26, 1940

2,223,143

UNITED STATES PATENT OFFICE 2,223,143

MEASURING INSTRUMENT

William B. Wendel, Memphis, Tenn.

Application November 30, 1938, Serial No. 243,291

3 Claims. (Cl. 88—14)

This invention relates to measuring instruments and more particularly to measuring instruments for comparing the absorption bands in the spectra of a known and an unknown substance. More particularly still this invention relates to a measuring instrument for determining the ratio of methemoglobin to hemoglobin or oxyhemoglobin in blood by comparison of absorption bands in the spectra of a known solution of blood with absorption bands in the spectra of an unknown solution of blood.

It is accordingly an object of this invention to provide a novel methemoglobinometer in which the ratio of methemoglobin to hemoglobin or oxyhemoglobin in blood may be readily and easily determined.

Another object of this invention is to provide a novel methemoglobinometer in which the ratio of methemoglobin to hemoglobin or oxyhemoglobin may be readily and easily determined by the comparison of absorption bands in the spectra of a standard and of an unknown solution of blood.

Another object of this invention is to provide a novel methemoglobinometer which may be accurately and efficiently used without skilled technical knowledge or previous experience.

A still further object of this invention is to provide a novel methemoglobinometer which is relatively cheap to manufacture, easy to operate, accurate, durable and compact.

Other and further objects of the present invention will appear as the description thereof proceeds.

It has long been known that the degree of absorption of a range of substances for light having wave lengths peculiarly correlated to the substance is dependent upon the thickness and concentration of the substance. These well known physical phenomena afford a convenient basis for measuring the concentration of chemically highly complex substances such as the normal blood pigments hemoglobin and oxyhemoglobin and their derivatives. It is particularly convenient for measuring the concentration of methemoglobin, a derivative formed and accumulated in the blood of those treated with certain useful drugs including acetanilid, sulfanilamide, plasmochin and the like. The presence of methemoglobin in the blood renders the blood less able to perform its important function of carrying oxygen from the lungs to the tissues making it important to be able to readily and efficiently determine the ratio of methemoglobin to the remainder of the blood pigments.

Methemoglobin has been found to have an absorption for light in the region of wave length $\lambda = 630\ m\mu$ in which region of the visible spectrum oxyhemoglobin and other blood substances have comparatively little absorption for light. It is also well known that all of the hemoglobin and oxyhemoglobin in drawn blood may be converted into methemoglobin by the addition of several known substances.

The accompanying drawing shows an illustrative embodiment of my novel methemoglobinometer utilizing the above described physical properties of methemoglobin to accomplish the above defined objects, but it is to be expressly understood that the embodiment shown in the drawing and hereafter described is shown for the purpose of illustration only and is not to be construed as a limitation of the present invention, reference being had to the appended claims to determine the scope of the present invention.

In the accompanying drawing in which like reference characters indicate similar parts Fig. 1 is a plan view of one embodiment of my novel methemoglobinometer;

Fig. 2 is a front elevation of the cylinder holder shown in the embodiment of Fig. 1 showing in more detail the arrangement of light filters; and Fig. 3 is a side elevation of the embodiment of my novel methemoglobinometer shown in Fig. 1.

In these figures 10 is a suitable instrument base of any convenient size and material and here shown as circular in shape. Mounted on base 10 is upright 11 carrying at its upper extremity sub-base member 12 which extends parallel to base member 10. Carried by upright 11 intermediate between base 10 and sub-base 12 is arm 13 carrying any suitable socket 14 for an electric light bulb 15, bulb 15 being any standard frosted white bulb of from 40 to 60 watts capacity. Surrounding bulb 15 is a cylindrical light shield 16 provided with an aperture 17.

Mounted on sub-base 12 is any suitable spectroscope 18 preferably of the direct vision hand variety with moderately high dispersion and movable slit though any other suitable type including the angular may be used. Spectroscope 18 is adjusted by set screw 19 into alignment with the beam of light emanating from aperture 17. Mounted on sub-base 12 between the spectroscope 18 and the aperture 17 and extending at right angles to the path of the beam of light emanating therefrom are parallel guides 20 and 21 suitably spaced apart to receive in sliding engagement a suitable cylinder block 22. Cylinder block 22 is cylindrically recessed at 23 and 24 to receive cylinders 25 and 26 respectively which may have any desired internal diameters, for example, from 10 to 30 mm., the pair being used always having the same diameter. Cylinder block 22 is also provided with cylindrical apertures 27 and 28 of diameter about half that of recesses 23 and 24 extending through block 22 and through cylindrical recesses 23 and 24 respectively and so spaced from the bottom of block 22 as to receive the beam of light from aperture 17 when block 22 is suitably and laterally adjusted. Block 22 is provided with a slot 29 designed to receive a screw 30 to limit the amount of lateral motion of block 22 in guides 20 and 21, slot 29 being so spaced and of such length that when screw 30 engages the right hand end of slot 29 (as seen in Fig. 2) cylindrical aperture 28 will be in the path of the beam of light emanating from aperture 17 and when screw 30 engages the left end of slot 29 cylindrical aperture 27 will be in the path of the beam of light. A suitable hand knob 31 is provided to assist in the movement of block 22.

Mounted on the face of block 22 adjacent spectroscope 18 and surrounding aperture 27 is any suitable bracket 32 designed to receive an optical filter 33 of suitable thickness and character to isolate that portion of the visible spectrum in which the light absorbing properties of methemoglobin differ most characteristically from those of normal blood pigment. Filter 33 is a light red filter glass about 3 mm. thick possessing sharp spectral cut off for wave lengths shorter than about $\lambda = 600 m\mu$. Also mounted on the face of block 22 adjacent spectroscope 18 and designed for manual rotation about a suitable pivot 34 is a disk 35 having let therein apertures 36, 37, 38 and 39 designed to be rotated over aperture 28 in block 22, aperture 36 being left open, aperture 37 having mounted therein an optical filter 40 similar to filter 33 but of 1 mm. thickness, aperture 38 having mounted therein an optical filter 41 similar to filter 33 but of 2 mm. thickness and aperture 39 having mounted therein an optical filter 42 in every way identical with filter 33.

In using the above described embodiment of my invention to determine the methemoglobin content of a sample of drawn blood, a standard and an unknown solution are made up from the sample. To make up the unknown solution 1 c. c. of blood is measured into cylinder 26 and 4 or 5 c. c. of dilute saponin solution is then added to lake the blood after which 1 c. c. of 20% ammonium acetate is added to the solution. Cylinder 26 is then placed in recess 24, light 15 turned on, and cylinder holder 22 moved to the left in Fig. 1 until the beam of light from aperture 17 passes through recess 28, through the blood solution in cylinder 26 and into the spectroscope 18. Disk 35 is now adjusted so that free aperture 36 is over recess 28. Spectroscope 18 is now adjusted until the red portion of the spectrum is visible. If a dark band is now seen across the red portion of the spectrum methemoglobin is present in the blood in concentration greater than 3% of the total blood pigment. If no dark band is visible then the blood solution in cylinder 26 is further diluted until it is certain whether there is an absorption band in the red portion of the spectrum at about $\lambda = 630 m\mu$.

When an absorption band is determined to exist at about $\lambda = 630 m\mu$ the standard solution above referred to is prepared. To prepare the standard solution 1 c. c. of the same blood used in preparing the unknown solution is measured into cylinder 25, laked with 10 c. c. of saponin solution and all hemoglobin and oxyhemoglobin in the solution are then rapidly converted to methemoglobin by the addition to the solution of one drop of 30% potassium ferricyanide and 1 c. c. of 20% ammonium acetate. This solution is then diluted to weaken the intensity of the absorption band of the methemoglobin. A 1:80 or 1:100 dilution of the blood in the standard solution is appropriate for normal total pigment concentration while anemic blood is diluted proportionally less. The standard solution in cylinder 25 is now placed in recess 23 in block 22 beside the unknown solution in cylinder 26. Block 22 is now moved to the position shown in Fig. 1 to allow the light from aperture 17 to pass through aperture 27, through the standard blood solution and through the filter 33 into the spectroscope 18, spectroscope 18 being then adjusted to show a moderately bright spectral field with a faint methemoglobin absorption band. Spectroscope 18 is now in proper adjustment and should not hereafter be changed. Block 22 is now moved to the left in Fig. 1 to bring the unknown solution in cylinder 26 into the beam of light and the relative intensities of the methemoglobin absorption bands are noted. Ordinarily the absorption band of the unknown will be more intense if the methemoglobin in the blood sample is more than 5% of the total blood pigment. The unknown solution is then progressively diluted by adding small quantities of saponin solution thereto until the methemoglobin absorption bands of both solutions appear identical in width and intensity. When this condition has been reached the final dilution of the 1 c. c. of blood in the unknown solution divided by the dilution of the 1 c. c. of blood in the standard solution, both expressed in c. c., represents the fraction of the blood pigment which is present as methemoglobin in the sample of blood analyzed. The absolute concentration of methemoglobin in the blood analyzed may be calculated from this fraction.

When dilutions of the unknown solution of from 1:5 or 1:10 are necessary to make the standard and unknown absorption bands of equal intensity then no filter need be used in the beam of light passing through the unknown solution. When greater dilutions than these are necessary then filters 40, 41 or 42 must be brought into the path of the beam of light the choice of the filter used depending on the dilution of the unknown solution, the greater the dilution the thicker the filter used. When the dilution of the blood in the unknown solution is low the light transmitted is limited principally by the oxyhemoglobin in the solution and is essentially the same as that transmitted by the standard solution plus the 3 mm. filter always used with the standard solution. When more dilute unknown solutions are being analyzed more light passes through the solution widening the boundaries of the spectrum because of the increased amount of yellow light reaching the eye. As the eye is more sensitive to the yellow portion of the spectrum the methemoglobin absorption band of the unknown appears disproportionately more intense than that of the standard solution causing the observer to dilute the unknown solution more than is actually necessary with the result that more methemoglobin is determined to be in the blood sample than is actually the case. This difficulty is avoided by the use of filters 40,

41 or 42 depending on the dilution of the unknown solution to make the red-yellow boundary alike in the spectra of both standard and unknown solutions. With dilutions of the unknown solution of from 1:10 to 1:20 filter 40 of 1 mm. thickness should be used. With dilutions of the unknown from 1:20 to 1:40 filter 41 of 2 mm. thickness should be used and for dilutions greater than 1:40 filter 42 of 3 mm. thickness should be used.

If desired cylinders 25 and 26 may be calibrated to read directly the percentage concentration of methemoglobin.

It will now be apparent that the present invention provides a novel methemoglobinometer for the ready and easy determination of the ratio of the methemoglobin to the hemoglobin or oxyhemoglobin in a blood sample by comparison of the absorption bands in the spectra of a standard and an unknown solution of the blood sample, the methemoglobinometer of the present invention being capable of use by those without technical knowledge or previous experience and at the same time one which is relatively cheap to manufacture, easy to operate, accurate, durable, and compact.

To those skilled in the art changes in or modifications of the above described illustrative embodiment of the present invention may now be suggested without departing from the inventive concept of the present invention. Reference should therefore be had to the appended claims to determine the scope of the present invention.

What is claimed is:

1. In an instrument for comparing the absorption bands of solutions, a spectroscope, a source of light, a pair of similar transparent containers designed for lateral movement into and out of the path of light from said source of light to said spectroscope, light filtering means secured to one of said containers to limit the spectrum of the solution in said container, and a plurality of light filtering means of varying thicknesses and means mounting said filters for selective movement before the second of said containers to correspondingly limit the spectrum of the solution in said second container to correspond to the spectrum in said first-named container.

2. In an instrument for comparing the absorption bands of a standard and an unknown solution a base, a spectroscope mounted on said base, a source of light mounted on said base opposite said spectroscope, a slide mounted on said base between said spectroscope and said source of light and adapted for lateral movement across the path of light emanating from said source and entering said spectroscope, a pair of similar transparent containers mounted in said slide for movement into and out of said path of light, a light filter secured to said slide adjacent said spectroscope to limit the spectrum of the standard solution in one of said containers, and a plurality of light filters of varying thicknesses rotatably mounted on said slide adjacent said spectroscope for rotation before the second of said containers to correspondingly limit the spectrum of the unknown solution in the second of said containers.

3. In an instrument for comparing the absorption bands of a standard and an unknown solution a base, a spectroscope mounted on said base, a source of light mounted on said base opposite said spectroscope, a slide mounted on said base between said spectroscope and said source of light adapted for lateral movement across the path of light emanating from said source and entering said spectroscope, a pair of similar transparent containers mounted in said slide for movement into and out of said path of light, a light filter secured to said slide adjacent said spectroscope to limit the spectrum of the standard solution in one of said containers, a disk rotatably mounted on said slide adjacent said spectroscope, a plurality of light filters of varying thicknesses mounted in said disk for rotation before the second of said containers to correspondingly limit the spectrum of the unknown solution in the second of said containers.

WILLIAM B. WENDEL.